US012092125B2

(12) United States Patent
Cordes et al.

(10) Patent No.: US 12,092,125 B2
(45) Date of Patent: Sep. 17, 2024

(54) PUMP DEVICE COMPRISING A RADIAL BEARING

(71) Applicant: HELLA GmbH & Co. KGaA, Lippstadt (DE)

(72) Inventors: Martin Cordes, Meschede (DE); Oliver Doering, Landau (DE); Ingo Geue, Bad Sassendorf (DE); Benjamin Grothe, Wickede (DE); Theodor Hueser, Geseke (DE); Dominik Niess, Lippstadt (DE); Christoph Schulte, Paderborn (DE); Stefan Schulte, Delbrueck (DE); Georgios Dimitrios Theodossiadis, Moosburg (DE); Christopher Vergers, Meschede (DE); Andreas Von Chamier-Cieminski, Lippstadt (DE); Mario Zimmer, Roesrath (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 90 days.

(21) Appl. No.: 17/673,450

(22) Filed: Feb. 16, 2022

(65) Prior Publication Data

US 2022/0170474 A1 Jun. 2, 2022

Related U.S. Application Data

(63) Continuation of application No. PCT/EP2020/072022, filed on Aug. 5, 2020.

(30) Foreign Application Priority Data

Aug. 16, 2019 (DE) ..................... 10 2019 122 042.4

(51) Int. Cl.
*F04D 29/046* (2006.01)
*F04D 9/00* (2006.01)
(Continued)

(52) U.S. Cl.
CPC ........... *F04D 29/046* (2013.01); *F04D 9/003* (2013.01); *F04D 13/0626* (2013.01);
(Continued)

(58) Field of Classification Search
CPC ........ F04D 9/003; F04D 13/026; F04D 13/06; F04D 13/0626; F04D 13/0633;
(Continued)

(56) References Cited

U.S. PATENT DOCUMENTS 3,877,844 A * 4/1975 Klaus .................... F04D 29/047 384/271
4,013,384 A * 3/1977 Oikawa ............... F04D 29/0413 415/10
(Continued)

FOREIGN PATENT DOCUMENTS

CN 1811192 A 8/2006
CN 101171427 A 4/2008
(Continued)

OTHER PUBLICATIONS

International Search Report dated Oct. 15, 2020 in corresponding application PCT/EP2020/072022.

*Primary Examiner* — John M Zaleskas
(74) *Attorney, Agent, or Firm* — Muncy, Geissler, Olds & Lowe, P.C.

(57) ABSTRACT

A pump device, in particular for a fluid circuit in a motor vehicle, comprising a housing, a drive, a rotor, a stator and a radial bearing, wherein the housing has an inlet, wherein the rotor comprises an impeller wheel, wherein the drive is designed to set the rotor in rotation relative to the stator, wherein the inlet is fluidly connected to the impeller wheel, wherein the rotor has a rotor cavity, wherein a section of the
(Continued)

stator projects into the rotor cavity, and wherein the radial bearing is situated in the rotor cavity between the section of the stator and the rotor.

14 Claims, 3 Drawing Sheets

(51) Int. Cl.
*F04D 13/06* (2006.01)
*F04D 29/22* (2006.01)
*F04D 29/42* (2006.01)

(52) U.S. Cl.
CPC ......... *F04D 13/0633* (2013.01); *F04D 29/22* (2013.01); *F04D 29/4206* (2013.01); *F05D 2240/61* (2013.01)

(58) Field of Classification Search
CPC .... F04D 13/0646; F04D 29/046; F04D 29/22; F04D 29/4206; F05D 2240/61
See application file for complete search history.

(56) References Cited

U.S. PATENT DOCUMENTS

| | | | | | |
|---|---|---|---|---|---|
| 4,047,847 | A * | 9/1977 | Oikawa | F04D 13/025 | 417/370 |
| 4,648,808 | A * | 3/1987 | Hauenstein | F04D 13/027 | 415/206 |
| 5,501,582 | A * | 3/1996 | Gautier | F04D 13/025 | 415/110 |
| 5,547,350 | A * | 8/1996 | Rawal | F04D 25/0606 | 417/423.12 |
| 6,254,361 | B1 * | 7/2001 | Sabini | F04D 13/0633 | 417/370 |
| 2008/0199334 | A1 | 8/2008 | Sorensen | | |
| 2008/0260515 | A1 * | 10/2008 | Anami | F04D 13/0633 | 415/55.2 |
| 2010/0028176 | A1 * | 2/2010 | Platt | F04D 13/027 | 415/10 |
| 2017/0082117 | A1 | 3/2017 | Zhou et al. | | |
| 2019/0257319 | A1 * | 8/2019 | Kuronuma | F04D 29/5866 | |
| 2021/0180609 | A1 * | 6/2021 | Geue | H02K 5/12 | |
| 2022/0173631 | A1 * | 6/2022 | Grothe | H02K 3/522 | |

FOREIGN PATENT DOCUMENTS

| | | | | |
|---|---|---|---|---|
| CN | 201080915 | Y * | 7/2008 | |
| DE | 7726026 | U | 11/1977 | |
| DE | 3305174 | A1 | 9/1984 | |
| DE | 3307726 | A1 | 9/1984 | |
| DE | 29822717 | U1 * | 3/1999 | F01P 5/10 |
| DE | 102012218861 | A1 * | 4/2014 | F04D 29/041 |
| EP | 0221300 | A1 * | 5/1987 | |
| FR | 2401339 | A1 * | 3/1979 | |
| FR | 2608228 | A1 | 6/1988 | |

* cited by examiner

PUMP DEVICE COMPRISING A RADIAL BEARING

This nonprovisional application is a continuation of International Application No. PCT/EP2020/072022, which was filed on Aug. 5, 2020, and which claims priority to German Patent Application No. 10 2019 122 042.4, which was filed in Germany on Aug. 16, 2019, and which are both herein incorporated by reference.

BACKGROUND OF THE INVENTION

Field of the Invention

The present invention relates to a pump device.

Description of the Background Art

Pump devices are known from the prior art, in which a drive sets a rotor in rotation relative to a stator. For this purpose, a shaft runs inside the rotor, which connects the rotor to the drive. The radial support takes place by means of a plain bearing, which is disposed on the shaft. An axial support takes place in an intake pipe or on an end face of the radial bearing.

SUMMARY OF THE INVENTION

It is therefore an object of the present invention to provide a more efficient pump device and a motor vehicle with such a pump device.

A pump device within the meaning of this description can also be referred to as a pump or pump unit.

The pump device can be suitable in particular for a fluid circuit in a motor vehicle. It comprises a housing, a drive, a rotor, a stator, and a radial bearing. In the context of this description, a radial bearing is understood to mean, in particular, a bearing, for example, a plain bearing, which restricts movement of the rotor in radial directions or even makes it impossible. Preferably, movements of the rotor are restricted or made impossible by the radial bearing in all radial directions.

Within the context of this description, the housing can also be referred to as a pump housing. The housing has an inlet. The rotor comprises an impeller wheel. The drive is designed to set the rotor in rotation relative to the stator. This can occur, for example, electromagnetically. The inlet is fluidly connected to the impeller wheel. In the context of this description, a fluidic connection is understood in particular to mean that a fluid can flow or stream from one component, here the inlet, to the other component, here the impeller wheel. In this case, this flow can be forced by means of fluid-conducting means, such as, for example, channels, lines, pipes, and/or bores.

The rotor has a rotor cavity. Said rotor cavity can be used, for example, to allow air to escape from the pump device. The escape of air from the pump device can also be referred to as venting and is necessary because the pumped fluid displaces air.

A section of the stator projects into the rotor cavity. The radial bearing is situated in the rotor cavity between the section of the stator and the rotor. The radial bearing can thus be situated around the section of the stator and thereby between the stator and the rotor. Due to the arrangement of the radial bearing, the rotor is supported in the radial direction. At the same time, the rotor cavity is available for venting, because no shaft protrudes through it.

The stator can have a stator cavity. The stator cavity can be surrounded by the section of the stator and thus project into the rotor cavity. In this regard, the stator cavity can be fluidly connected to the rotor cavity. For example, the stator cavity can merge into the rotor cavity. The stator cavity can also be used for venting, for example. In this case, the displaced air can flow, for example, from the stator cavity via the rotor cavity to a vent outlet.

The stator cavity and/or the rotor cavity can be free of a shaft. In this case, the stator cavity and the rotor cavity are particularly well suited for ventilation, because the air flow is not disrupted by a shaft. For example, it is possible that the rotor is driven electromagnetically.

The pump device can comprise a vent outlet. In the context of this description, this is understood to mean in particular an outlet through which the displaced air can be discharged to an area surrounding the pump device. The vent outlet can be fluidly connected to the rotor cavity so that air can flow from the stator cavity through the rotor cavity to the vent outlet.

The section of the stator can project into the rotor cavity at a first end of the rotor. The impeller wheel can be disposed at a second end of the rotor. The second end can be disposed opposite the first end.

The radial bearing can have a first and a second bearing region. The radial bearing can have a first outer diameter in the first bearing region and a second outer diameter in the second bearing region. The second outer diameter in this case can be smaller than the first outer diameter. The two bearing sections can be connected, for example, to one another via a third bearing region, wherein the third bearing region has a sloping outer surface. In the context of this description, the outer diameter is understood to mean in particular the diameter of the particular component on its outer side. In the case of the radial bearing, the outer side can face the rotor. The bearing regions with different outer diameters can improve the support.

The section of the stator can have a first and a second region. The section can have a third outer diameter in the first region and a fourth outer diameter in the second region. The fourth outer diameter in this case can be smaller than the third outer diameter. It is also possible that the third outer diameter is smaller than the first outer diameter and the fourth outer diameter is smaller than the second outer diameter. The inner diameter of the section can be constant. The different outer diameters of the section of the stator can be advantageous for a better support of the rotor. In particular, it is possible that the section in the transition from the first region to the second region has a circumferential collar on which the radial bearing is supported in the axial direction of the rotor.

The first bearing region and the first region of the section can partially overlap. The second bearing region can partially overlap with the second region of the section.

The pump device can comprise a bearing situated between the impeller wheel and the housing.

The bearing can be designed for the axial support of the rotor.

The housing can have an annular groove and the impeller wheel can have an annular projection which projects into the groove. Such a projection and such a groove are described in German patent application DE 10 2019 115 774, which is incorporated herein by reference. The projection is referred to as a rim in the patent application. The bearing can be situated between the projection and the housing. In particular, the bearing can be disposed in the groove. Due to the arrangement of the bearing described above, gaps between the housing and the bearing can be made particularly small. This increases the efficiency of the pump device. In addition, the bearing has no or only a little effect on the venting of the pump device. The bearing can have a ring shape, for example.

The bearing can be designed for the radial support of the rotor. For example, it can therefore be designed both for the axial and for the radial support of the rotor. The additional radial support provided by the bearing enables a simpler design of the radial bearing, because fewer forces act on the radial bearing. For example, the radial bearing can thus be smaller and have a relatively simple shape as a ring. In addition, the section of the stator that protrudes into the rotor cavity can be made shorter, so that ventilation is further improved.

The bearing may have an L-shaped cross-sectional area. One leg of the L-shape can contribute to the axial support and the other leg of the L-shape to the radial support of the rotor.

The pump device can comprise an outlet. The impeller wheel can be designed to cause a fluid flow from the inlet to the outlet when the rotor is set in rotation by the drive.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Pump device 100 comprises a housing 101, an inlet 102, and an outlet 103. Pump device 100 is designed to be connected to a fluid circuit with inlet 102 and outlet 103. In operation, pump device 100 causes a flow of the fluid in the fluid circuit.

Figure 1:
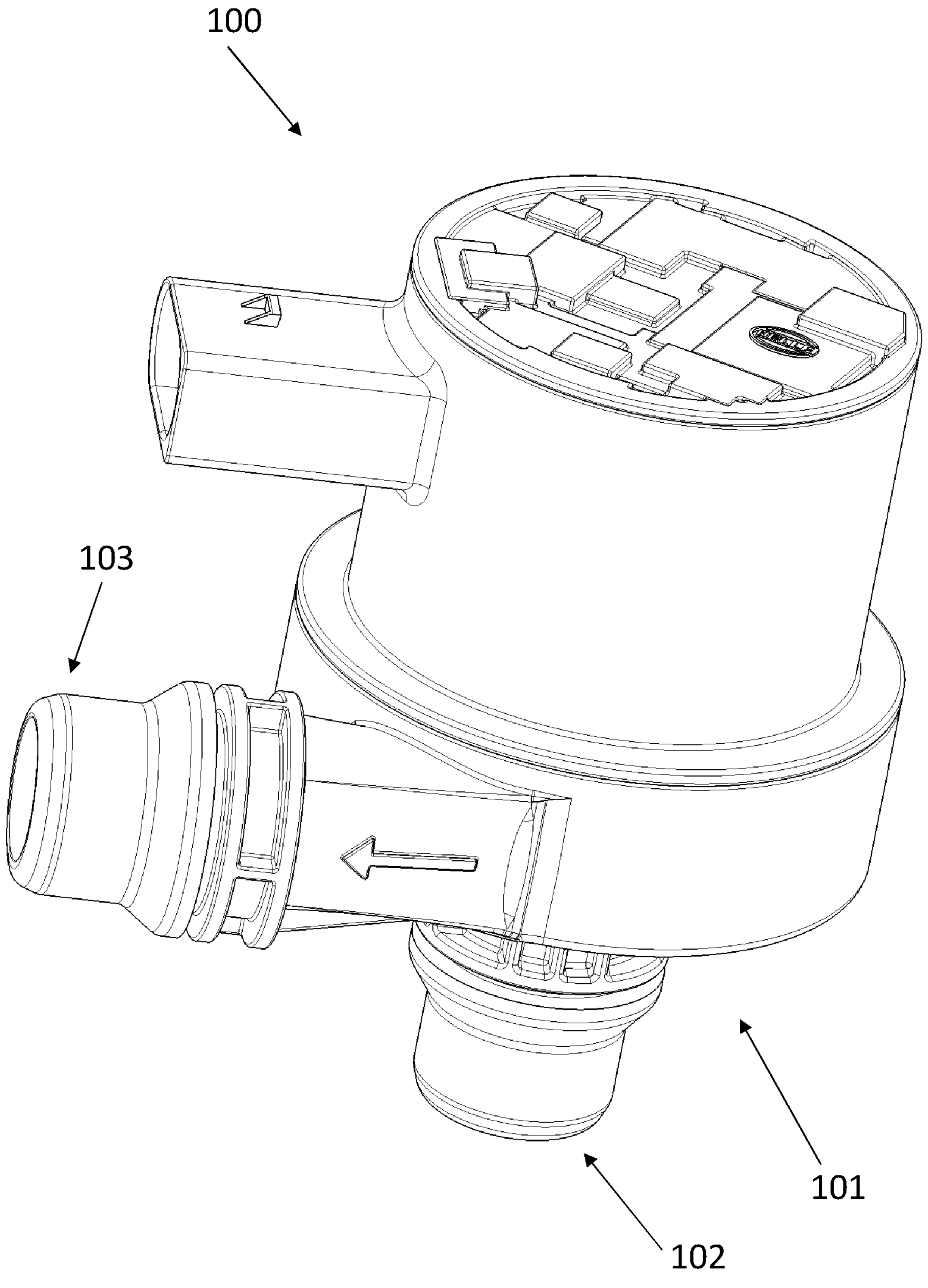
FIG. 1 shows a schematic perspective view of a pump device according to one embodiment of the invention.
Figure 2:
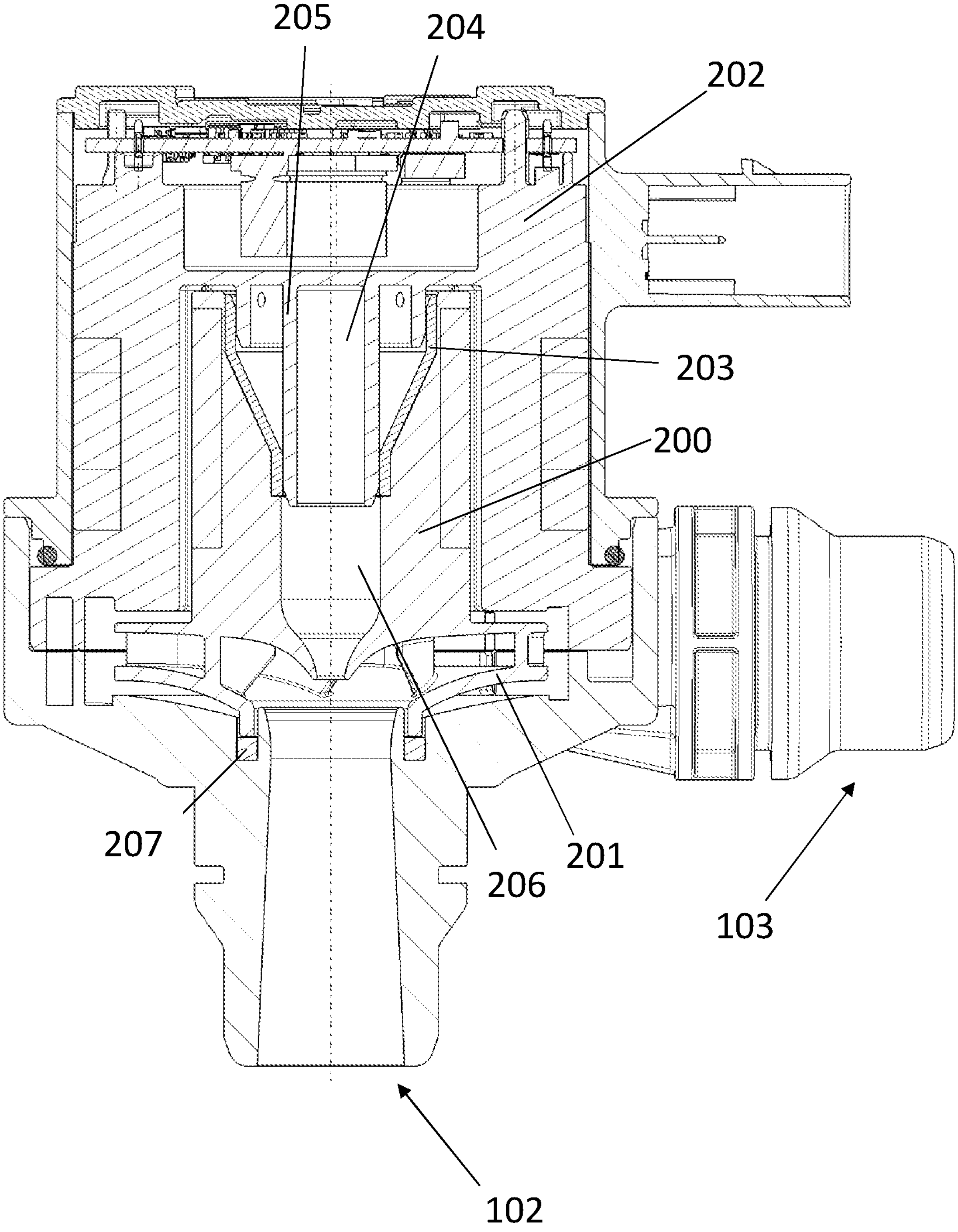
FIG. 2 shows a schematic sectional view of a pump device according to one embodiment of the invention.

The embodiment shown in FIG. 2 comprises an inlet 102, an outlet 103, a rotor 200 with an impeller wheel 201 and with a rotor cavity 206, a stator 202 with a section 205 and with a stator cavity 204, a radial bearing 203, and a bearing 207. Section 205 projects into rotor cavity 206. Stator cavity 204 is disposed in section 205 and is fluidly connected to rotor cavity 206. Radial bearing 203 is disposed between section 205 and rotor 200.

Radial bearing 203 has a larger outer diameter in a first region than in a second region. The outer diameter of radial bearing 203 tapers continuously between the first region and the second region. This shape of radial bearing 203 is particularly advantageous for a good radial support of rotor 200. The shape is particularly advantageous for good lubrication of radial bearing 203.

Bearing 207 is used for the axial support of rotor 200. The bearing is arranged in a groove of the housing between a projection of impeller wheel 201 and the housing and is formed annular. At this position, bearing 207 has little or even no effect on both the fluid flow and the ventilation flow.

Stator cavity 204 and rotor cavity 206 are free of a shaft. As a result, rotor cavity 206 and stator cavity 204 can be used particularly well for venting pump device 100. The air can be routed through stator cavity 204 and rotor cavity 206 to a vent outlet through which it then exits pump device 100 into the environment.

During operation, rotor 200 with impeller wheel 201 is set in rotation relative to stator 202 by a drive (not shown). In the process, a fluid, for example, a working fluid of a motor vehicle, is drawn in through inlet 102 and conveyed to outlet 103 by means of impeller wheel 201. The air displaced thereby flows through stator cavity 204 and rotor cavity 206 to a vent outlet.

Figure 3:
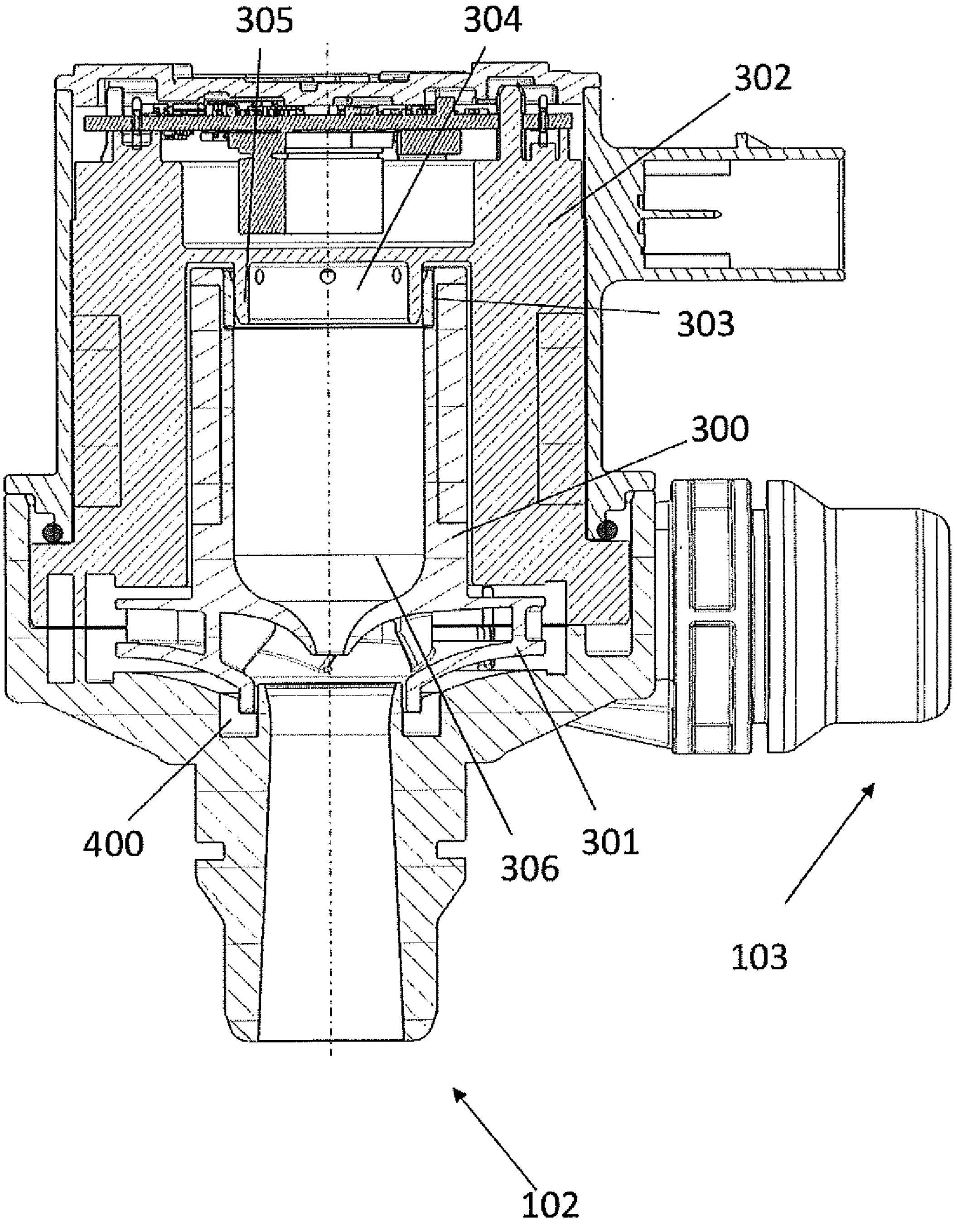
FIG. 3 shows a schematic sectional view of a pump device according to one embodiment of the invention.

The embodiment shown in FIG. 3 differs from the embodiment shown in FIG. 2, among other things, in the shape of radial bearing 303 and in the shape of section 305 of stator 302. Radial bearing 303 is formed annular. Consequently, section 305 therefore has a constant outer diameter. In addition, section 305 projects less far into stator 300 than in the embodiment according to FIG. 2.

Instead of the annular bearing 207 from FIG. 2, the embodiment in FIG. 3 has a bearing 400 that is L-shaped in cross section. This L-shaped bearing 400 is used for both the axial and the radial support of rotor 300. Bearing 400 has in particular the advantage over bearing 207 from FIG. 2 in that the gaps between the housing and the projection of the impeller wheel 301 can be made smaller.

However, the operation of the embodiment of FIG. 3 is similar to that of the embodiment of FIG. 2. The advantage of the shape of radial bearing 303 and the shorter section 305 is primarily an improved air flow during ventilation through stator cavity 304 and rotor cavity 306 as compared to the embodiment of FIG. 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pump for a fluid circuit in a motor vehicle, the pump comprising:
- a housing;
- a rotor;
- a stator; and
- a radial bearing,
- wherein the housing has an inlet,
- wherein the rotor comprises an impeller wheel,
- wherein the rotor rotates relative to the stator about a longitudinal axis,
- wherein the inlet is fluidly connected to the impeller wheel,
- wherein the rotor has a rotor cavity that extends along the longitudinal axis,
- wherein a section of the stator projects into the rotor cavity,
- wherein, with respect to a radial direction of the longitudinal axis, the radial bearing is situated in the rotor cavity between the section of the stator and the rotor, such that an inner circumferential surface of the section of the stator is positioned closer to the longitudinal axis than an inner circumferential surface of the radial bearing, and wherein the radial bearing has a first bearing region, a second bearing region and a third bearing region, wherein in the first bearing region, a first outer surface of the radial bearing has a first outer diameter and in the second bearing region, a second outer surface of the radial bearing has a second outer diameter that is smaller than the first outer diameter, and wherein the third bearing region connects the first bearing region to the second bearing region, such that the third bearing region has a sloped outer surface that extends from the first outer surface having the first outer diameter to the second outer surface having second outer diameter that is smaller than the first outer diameter.

2. The pump according to claim 1, wherein the stator has a stator cavity, wherein the stator cavity is surrounded by the section of the stator, and wherein the stator cavity is fluidly connected to the rotor cavity.

3. The pump according to claim 2, wherein the stator cavity and/or the rotor cavity are free of a shaft.

4. The pump according to claim 2, wherein the pump comprises a vent outlet, wherein the vent outlet is fluidly connected to the rotor cavity so that air flows from the stator cavity through the rotor cavity to the vent outlet.

5. The pump according to claim 1, wherein the section of the stator projects into the rotor cavity at a first end of the rotor, wherein the impeller wheel is disposed at a second end of the rotor, and wherein the second end is disposed opposite the first end.

6. The pump according to claim 1, wherein the section of the stator has a first region and a second region, wherein the section of the stator has a third outer diameter in the first region and a fourth outer diameter in the second region, and wherein the fourth outer diameter is smaller than the third outer diameter.

7. The pump according to claim 6, wherein the first bearing region of the radial bearing and the first region of the section of the stator partially overlap in the radial direction and wherein the second bearing region of the radial bearing and the second region of the section of the stator partially overlap in the radial direction.

8. The pump according to claim 1, wherein the pump comprises a bearing situated between the impeller wheel and the housing.

9. The pump according to claim 8, wherein the bearing axially supports the rotor.

10. The pump according to claim 9, wherein the housing has an annular groove and the impeller wheel has an annular projection which projects into the annular groove, and wherein the bearing is situated between the annular projection and the housing.

11. The pump according to claim 8, wherein the bearing radially supports the rotor.

12. The pump according to claim 11, wherein the bearing has an L-shaped cross-sectional area.

13. The pump according to claim 1, wherein the pump comprises an outlet, wherein the impeller wheel causes a fluid flow from the inlet to the outlet when the rotor rotates.

14. A motor vehicle, comprising the pump according to claim 1 and a fluid circuit, wherein the pump pumps a fluid in the fluid circuit.

* * * * *